US008600876B2

(12) United States Patent
Smith et al.

(10) Patent No.: US 8,600,876 B2
(45) Date of Patent: Dec. 3, 2013

(54) CUSTOMER ASSISTANCE SYSTEM

(75) Inventors: Kera Porri Smith, Lincoln University, PA (US); Linda Ann Eddy, Clyde, NC (US); Anna Vladimirovna Starikova, Santa Clarita, CA (US); Amanda Jane Summers, North East, MD (US); Dana Renee Wassam, Landenberg, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/200,447

(22) Filed: Sep. 23, 2011

(65) Prior Publication Data

US 2013/0080303 A1    Mar. 28, 2013

(51) Int. Cl.
*G06Q 40/02* (2012.01)

(52) U.S. Cl.
USPC ............................ 705/38; 705/35; 705/39

(58) Field of Classification Search
USPC .............................................. 705/35, 38, 39
See application file for complete search history.

(56) References Cited

U.S. PATENT DOCUMENTS

| | | | |
|---|---|---|---|
| 5,930,775 A | 7/1999 | McCauley et al. | 705/38 |
| 5,933,817 A | 8/1999 | Hucal | 705/39 |
| 6,298,335 B1 | 10/2001 | Bernstein | 705/40 |
| 6,456,983 B1 | 9/2002 | Keyes et al. | 705/36 |
| 6,823,319 B1 | 11/2004 | Lynch et al. | 705/38 |
| 6,901,384 B2 | 5/2005 | Lynch et al. | 705/38 |
| 6,954,741 B1 | 10/2005 | Burchetta et al. | 705/80 |
| 7,089,503 B1 | 8/2006 | Bloomquist et al. | 715/780 |
| 7,254,558 B2 * | 8/2007 | Hinkle et al. | 705/40 |
| 7,295,999 B1 | 11/2007 | Simon et al. | 705/36 R |
| 7,401,050 B2 * | 7/2008 | O'Neill | 705/39 |
| 7,409,364 B1 | 8/2008 | Barton et al. | 705/35 |
| 7,467,109 B1 | 12/2008 | Simon et al. | 705/36 R |
| 7,558,756 B1 | 7/2009 | Wesly et al. | 705/38 |
| 7,559,217 B2 | 7/2009 | Bass | 70/40 |
| 7,574,401 B1 | 8/2009 | Burns | 705/38 |
| 7,676,410 B2 | 3/2010 | Petralia | 705/35 |
| 7,685,061 B2 | 3/2010 | Haworth et al. | 705/38 |
| 7,689,504 B2 | 3/2010 | Warren et al. | 705/38 |
| 7,747,525 B2 | 6/2010 | Grant et al. | 705/39 |

(Continued)

FOREIGN PATENT DOCUMENTS

NO    2004029850 A2 *    4/2004    ............. G06F 17/60

OTHER PUBLICATIONS

Pending U.S. Appl. No. 13/200,481 entitled *Customer Assistance System* in the name of Kera Porri Smith, et al.; 36 total pages, filed Sep. 23, 2011.

(Continued)

*Primary Examiner* — Jagdish Patel
(74) *Attorney, Agent, or Firm* — Michael A. Springs

(57) ABSTRACT

An apparatus may include a network interface configured to receive data from and communicate data to a remote electronic device and a processor coupled to the network interface. The processor may be configured to display to the user interface an electronic query regarding whether the customer is willing to pay at least a portion of the past-due amount, receive via the user interface and the network interface a response to the query and, in response to a customer indication that the customer is unwilling to pay at least a portion of the past-due amount, and determine, based on known information regarding the customer, whether the customer is eligible for a payment program for an account with a past-due amount.

24 Claims, 8 Drawing Sheets

(56) References Cited

U.S. PATENT DOCUMENTS

| | | | |
|---|---|---|---|
| 7,818,228 B1 | 10/2010 | Coulter | 705/35 |
| 7,818,229 B2 | 10/2010 | Imrey et al. | 705/35 |
| 7,840,440 B2 | 11/2010 | Burchetta et al. | 705/26 |
| 7,860,787 B2 | 12/2010 | Oppenheimer et al. | 705/38 |
| 8,200,578 B2* | 6/2012 | Hill et al. | 705/40 |
| 2001/0044772 A1 | 11/2001 | Allen et al. | 705/38 |
| 2001/0044773 A1 | 11/2001 | Sellers et al. | 705/38 |
| 2002/0007342 A1 | 1/2002 | Sellers et al. | 705/38 |
| 2002/0059139 A1 | 5/2002 | Evans | 705/40 |
| 2002/0123949 A1 | 9/2002 | VanLeeuwen | 705/35 |
| 2002/0161699 A1 | 10/2002 | Okamoto et al. | 705/38 |
| 2003/0028477 A1 | 2/2003 | Stevenson et al. | 705/38 |
| 2003/0074290 A1 | 4/2003 | Clore | 705/35 |
| 2003/0078879 A1 | 4/2003 | Ieshima et al. | 705/38 |
| 2003/0078881 A1 | 4/2003 | Elliott et al. | 705/39 |
| 2003/0167218 A1 | 9/2003 | Field et al. | 705/35 |
| 2004/0019560 A1 | 1/2004 | Evans et al. | 705/40 |
| 2004/0044607 A1 | 3/2004 | Hedrick, Jr. et al. | 705/35 |
| 2004/0088253 A1* | 5/2004 | Crispyn et al. | 705/40 |
| 2004/0128230 A1 | 7/2004 | Oppenheimer et al. | 705/38 |
| 2004/0243508 A1 | 12/2004 | Samson et al. | 705/38 |
| 2005/0097033 A1 | 5/2005 | Pretell et al. | 705/38 |
| 2005/0278246 A1 | 12/2005 | Friedman et al. | 705/38 |
| 2005/0283418 A1 | 12/2005 | Thornborough et al. | 705/35 |
| 2006/0143104 A1* | 6/2006 | Wagonheim | 705/35 |
| 2006/0229975 A1 | 10/2006 | Wiatrak | 705/38 |
| 2007/0156552 A1 | 7/2007 | Manganiello | 705/35 |
| 2007/0156554 A1 | 7/2007 | Nikoley et al. | 705/35 |
| 2008/0086400 A1 | 4/2008 | Ardelean et al. | 705/35 |
| 2008/0103960 A1 | 5/2008 | Sweeney | 705/38 |
| 2008/0172297 A1* | 7/2008 | Reynolds | 705/14 |
| 2009/0018936 A1 | 1/2009 | Chien | 705/30 |
| 2009/0048957 A1 | 2/2009 | Celano | 705/35 |
| 2010/0010885 A1 | 1/2010 | Hill et al. | 705/14.15 |
| 2010/0023434 A1 | 1/2010 | Bond | 705/35 |
| 2010/0179888 A1 | 7/2010 | Warren et al. | 705/27 |
| 2010/0179904 A1 | 7/2010 | Morano et al. | 705/38 |
| 2010/0205089 A1 | 8/2010 | Srinivasan et al. | 705/38 |
| 2010/0262534 A1 | 10/2010 | Kaufman | 705/38 |
| 2010/0268640 A1 | 10/2010 | Kuyper et al. | 705/38 |
| 2010/0287093 A1* | 11/2010 | He et al. | 705/38 |
| 2010/0299245 A1 | 11/2010 | Kaufman | 705/38 |
| 2010/0306100 A1 | 12/2010 | Kaufman | 705/38 |
| 2011/0022512 A1 | 1/2011 | Johnson et al. | 705/38 |
| 2011/0035315 A1 | 2/2011 | Langley | 705/38 |

OTHER PUBLICATIONS

Pending U.S. Appl. No. 13/200,465 entitled *Customer Assistance System* in the name of Kera Porri Smith, et al.; 34 total pages, filed Sep. 23, 2011.

USPTO Office Action for U.S. Appl. No. 13/200,465 in the name of Kera Porri Smith, et al.; 9 pages, Oct. 16, 2012.

USPTO Office Action for U.S. Appl. No. 13/200,481 in the name of Kera Porri Smith, et al.; 12 pages, Nov. 16, 2012.

USPTO; Office Action for U.S. Appl. No. 13/200,465 in the name of Kera Porri Smith, et al.; 11 pages, Mar. 29, 2013.

USPTO; Office Action for U.S. Appl. No. 13/200,481 in the name of Kera Porri Smith, et al.; 10 pages, Apr. 30, 2013.

* cited by examiner

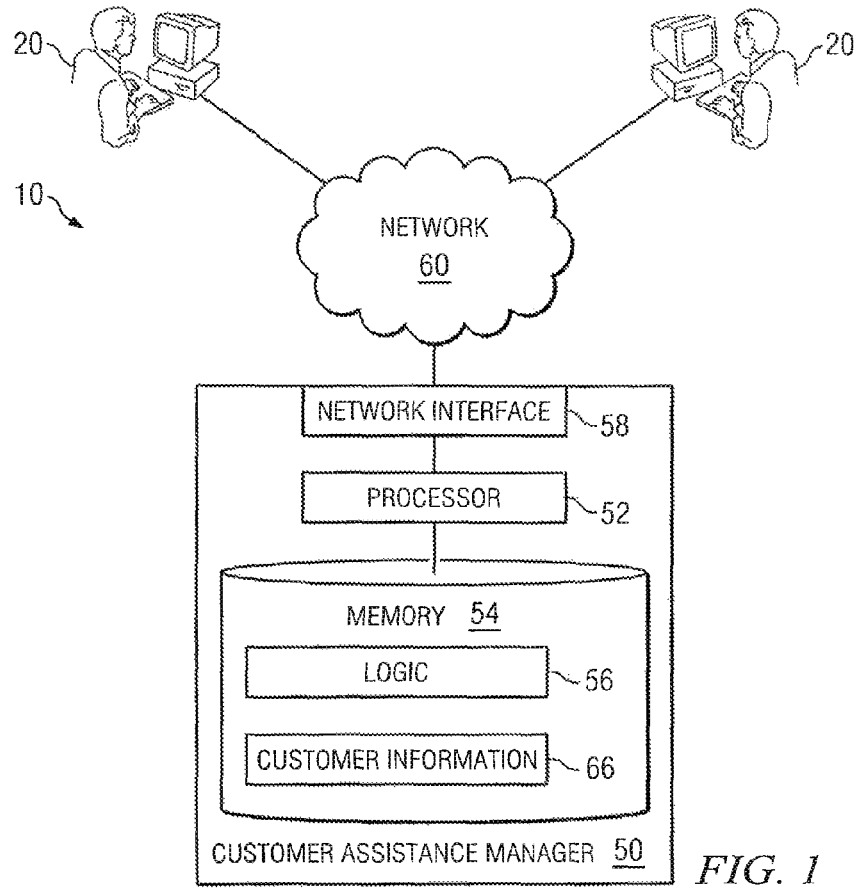

*FIG. 1*

ABC BANK     FirstName LastName
123456789A

REDUCED SETTLEMENT PROGRAM AGREEMENT

< lorem ipsum sed ut perspiciatis unde omnis iste natus error sit voluptatem accusantium doloremque laudantium, totam rem aperiam, eaque ipsa quae ab illo inventore veritatis et quasi architecto beatae vitae dicta sunt explicabo. nemo enim ipsam voluptatem quia voluptas sit aspernatur aut odit aut fugit, sed quia consequuntur magni dolores eos qui ratione voluptatem sequi nesciunt.labore et dolore aliquam quaerat voluptatem. >

( AGREE )     ( I DO NOT AGREE )

*FIG. 3E*

ABC BANK          FirstName LastName
123456789A

ⓘ IMMEDIATE ATTENTION REQUIRED: YOU HAVE ONE OR MORE PAST DUE ACCOUNTS!

| ACCOUNT NAME | BALANCE | PAST DUE | ACTION | | |
|---|---|---|---|---|---|
| A | $1,450.00 | $254.99 | ( PAY NOW ) | ( MAKE PROMISE TO PAY ) | ( I CANNOT MAKE A PAYMENT ) |
| B | $842.44 | $109.39 | ( PAY NOW ) | ( MAKE PROMISE TO PAY ) | ( I CANNOT MAKE A PAYMENT ) |
| C | $989.00 | $0.00 | | | |

*FIG. 3A*

ABC BANK          FirstName LastName
123456789A

ACCOUNT NAME    A
PAST DUE AMOUNT    $254.99

CAN YOU PAY THE PAST DUE AMOUNT BY <MM/DD/YYYY>?
     ○ YES     ○ NO

GOING FORWARD WILL YOU BE ABLE TO MAKE YOUR MINIMUM MONTHLY PAYMENT?
     ○ YES     ○ NO

*FIG. 3B*

```
ABC BANK                            FirstName LastName
                                         #123456789A
    ACCOUNT NAME    A
    PAST DUE AMOUNT  $254.99

I AGREE TO PAY

⦿ ACCOUNT BALANCE  <$1,450.00>
            ○ PAST DUE AMOUNT  <$254.99>
            ○ OTHER AMOUNT
                $ [        ]

BY DATE
                [  /  /     ]
                 MM  DD  YYYY ( SUBMIT )    ( CANCEL )
```

*FIG. 3C*

```
ABC BANK                            FirstName LastName
                                         #123456789A
    SETTLEMENT PROGRAM TERMS AND CONDITIONS
    YOUR ACCOUNT WITH PAST DUE AMOUNT OF $254.99 QUALIFIES FOR A SETTLEMENT
    IN THE AMOUNT OF $1,200.00. THE REMAINING $250.00 WILL BE FORGIVEN.

PLEASE SELECT UP TO 3 INSTALLMENTS TO MAKE PAYMENT

○ 1 INSTALLMENT OF $1,200
        ○ 2 INSTALLMENTS OF $600
        ⦿ 3 INSTALLMENTS OF $400

PLEASE ENTER PAYMENT DATES OF INSTALLMENTS

1st INSTALLMENT BY    [ 10 / 27 / 2011 ]
        2nd INSTALLMENT BY    [ 11 / 27 / 2011 ]
        3rd INSTALLMENT BY    [ 12 / 27 / 2011 ]

( CONTINUE TO      )  ( DECLINE    )  ( REMIND    )
      ( ACCEPT SETTLEMENT)  ( SETTLEMENT )  ( ME LATER  )
```

*FIG. 3D*

ABC BANK  FirstName LastName
123456789A

FIX PAYMENT PROGRAM TERMS AND CONDITIONS
YOUR ACCOUNT WITH PAST DUE AMOUNT OF $254.99 QUALIFIES FOR A FIXEDPAYMENT PROGRAM. YOUR PAYMENT WILL GO FROM $240.00 TO $200.00. YOUR APR WILL GO FROM 16.99% TO 13.99 %.

YOUR FIRST PAYMENT OF $200.00 IS DUE BY 10/27/2011.

WHAT DATE WILL YOU BE MAKING THIS PAYMENT:

[ 10 / 27 / 2011 ]

( PROCEED TO ACCEPT PROGRAM )    ( DECLINE PROGRAM )    ( REMIND ME LATER )

*FIG. 3F*

CUSTOMER ASSISTANCE SYSTEM

TECHNICAL FIELD

The present invention relates generally to management of customer accounts, and more particularly to a system for providing assistance to customers of an enterprise.

BACKGROUND

Financial institutions often issue loans to their customers in the form of mortgages, installment loans, credit lines, credit card accounts, and other accounts whereby a customer incurs a debt in favor of the financial institution. Oftentimes, and for various reasons, a customer debtor of a financial institution may fail to repay the loan debt in accordance with the terms and conditions of the loan (e.g., by failing to make payments when due). Occurrence of such failure to repay a loan may be indicative of a customer's inability or difficulty in meeting loan obligations, and thus may present financial risk to the financial institution in the event the customer is unable to satisfy the outstanding loan balance. To mitigate this risk, representatives of a financial institution may manually contact a customer (e.g., via telephone, letter, e-mail, etc.) to offer assistance to the customer in paying all or part of past-due balances or installments of a loan account. In some instances, a customer may also initiate contact with the financial institution to seek such assistance. Such assistance may be an offer for credit counseling, an offer for an alternative payment plan for the loan, or other suitable assistance. However, for financial institutions with numerous customers who have failed to make loan payments, such manual contact to offer assistance may be difficult and/or costly.

SUMMARY

In accordance with the present disclosure, the disadvantages and problems associated with prior systems and methods for providing customer assistance to loan customers of a financial institution have been substantially reduced or eliminated.

In accordance with embodiments of the present disclosure, an apparatus may include a network interface configured receive data from and communicate data to a remote electronic device and a processor coupled to the network interface. The processor may be configured to display to the user interface an electronic query regarding whether the customer is willing to pay at least a portion of the past-due amount, receive via the user interface and the network interface a response to the query and, in response to a customer indication that the customer is unwilling to pay at least a portion of the past-due amount: (i) determine, based on known information regarding the customer, whether the customer is eligible for a payment program for an account with a past-due amount; and (ii) in response to determining that the customer is eligible for a payment program: (a) display to the user interface terms and conditions associated with a payment program agreement; and (b) display to the user interface an electronic form for entry of information related to payment in accordance with the payment program agreement.

Technical advantages of the present invention may be readily apparent to one skilled in the art from the figures, description and claims included herein.

BRIEF DESCRIPTION OF THE DRAWINGS

For a more complete understanding of the present invention and its advantages, reference is now made to the following description taken in conjunction with the accompanying drawings, in which:

FIG. 1 illustrates a customer assistance management system in accordance with particular embodiments of the present disclosure;

FIGS. 3A-3F illustrate user interface screens that may be displayed to a customer interfacing with a customer assistance manager in accordance with particular embodiments of the present disclosure.

DETAILED DESCRIPTION

Figure 2A:
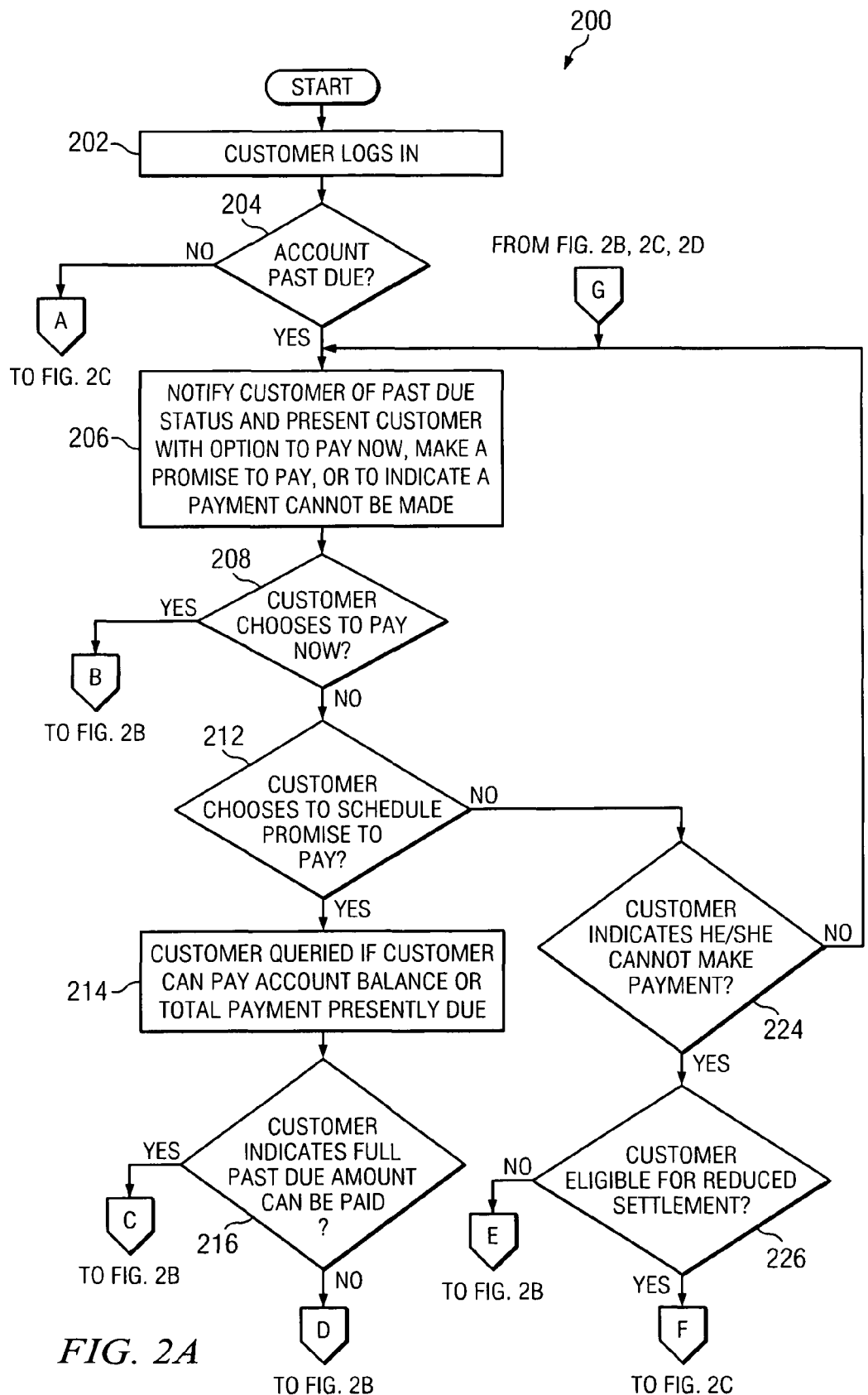
FIGS. 2A-2D illustrate a flow chart illustrating an example method of providing customer assistance via a customer assistance management system, in accordance with particular embodiments of the present disclosure.

FIG. 1 illustrates a customer assistance management system 10 in accordance with particular embodiments of the present disclosure. System 10 may include one or more customers 20 and customer assistance manager 50. Customers 20 and customer assistance manager 50 may be communicatively coupled by network 60. System 10 is generally operable to provide automated customer assistance to customers 20. To provide such customer assistance, customer assistance manager 50 may communicate and interact with a customer 20, as described in greater detail below.

Customers 20 (which may collectively be referred to as "customers 20" or individually as "customer 20") may represent any person and/or device that may submit information to and/or receive information from customer assistance manager 50 via network 60, for example a request for assistance, an offer for assistance, customer demographic information, a request for customer demographic information, etc. A customer 20 may communicate with customer assistance manager 50 via a computer, smart phone, telephone or other electronic device interfaced to network 60. For example, customer 20 may interface with customer assistance manager 50 via a web browser displaying the financial institution's website and configured to interact with customer assistance manager 50.

Figure 2B:
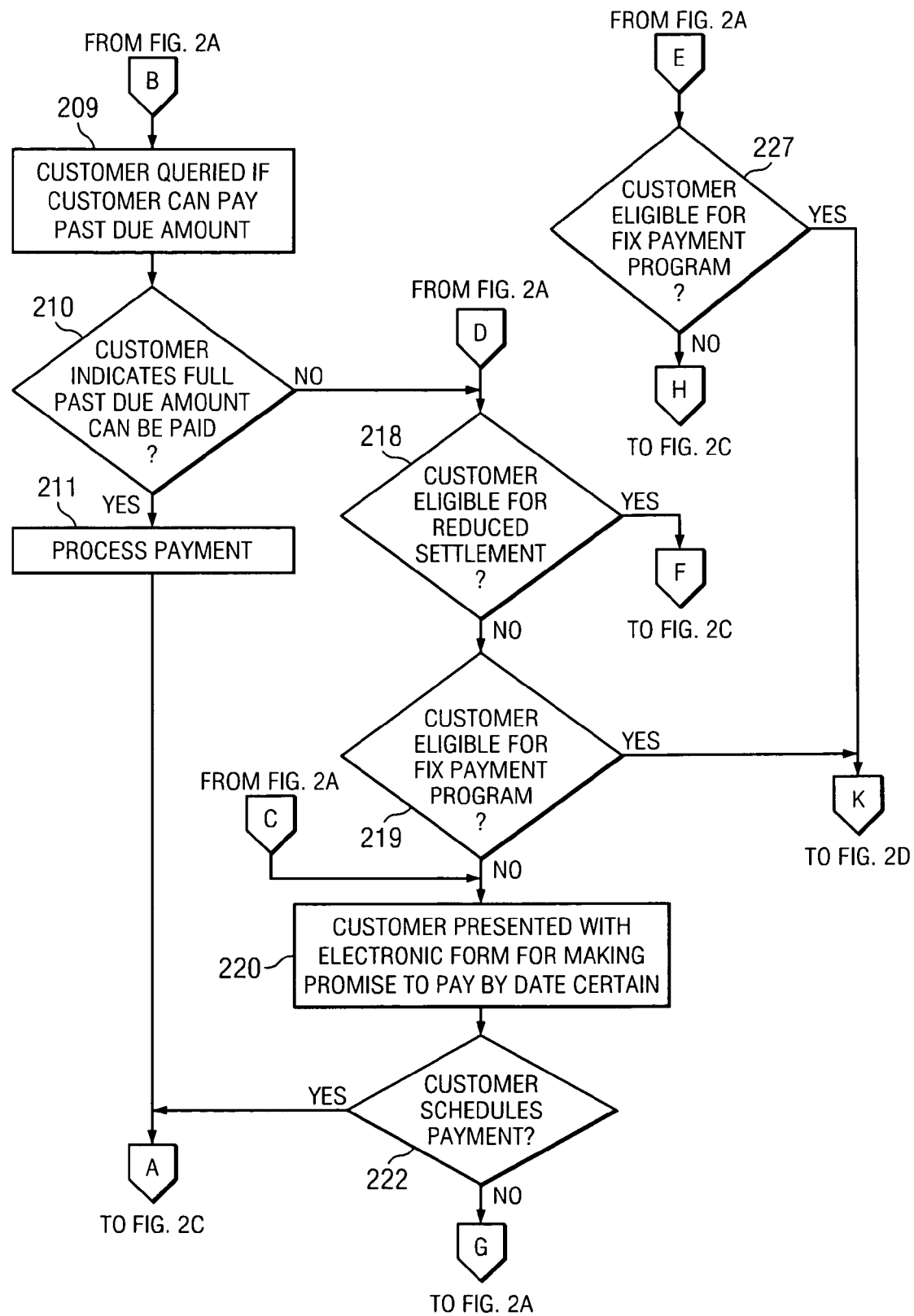
Figure 2C:
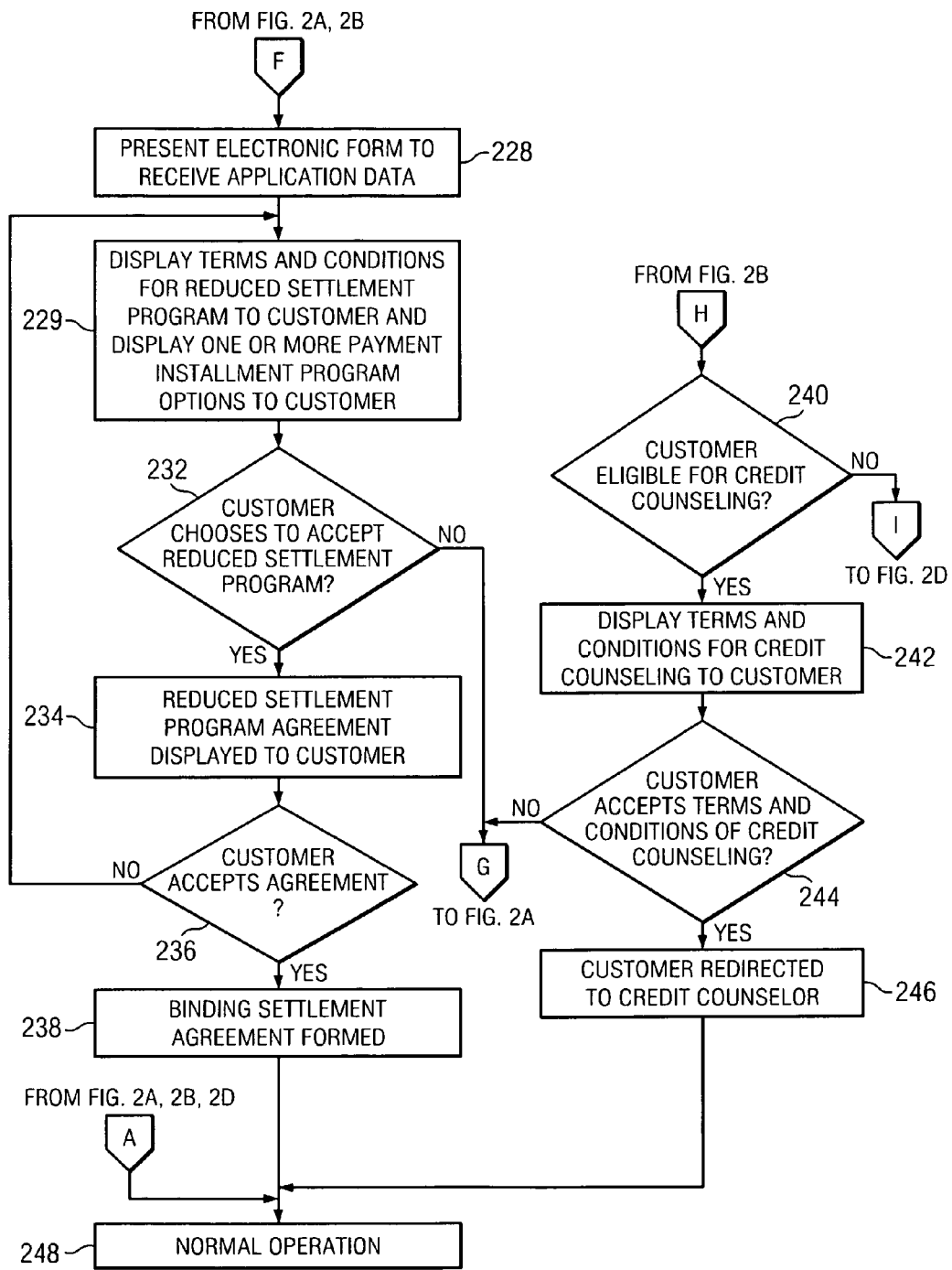
Figure 2D:
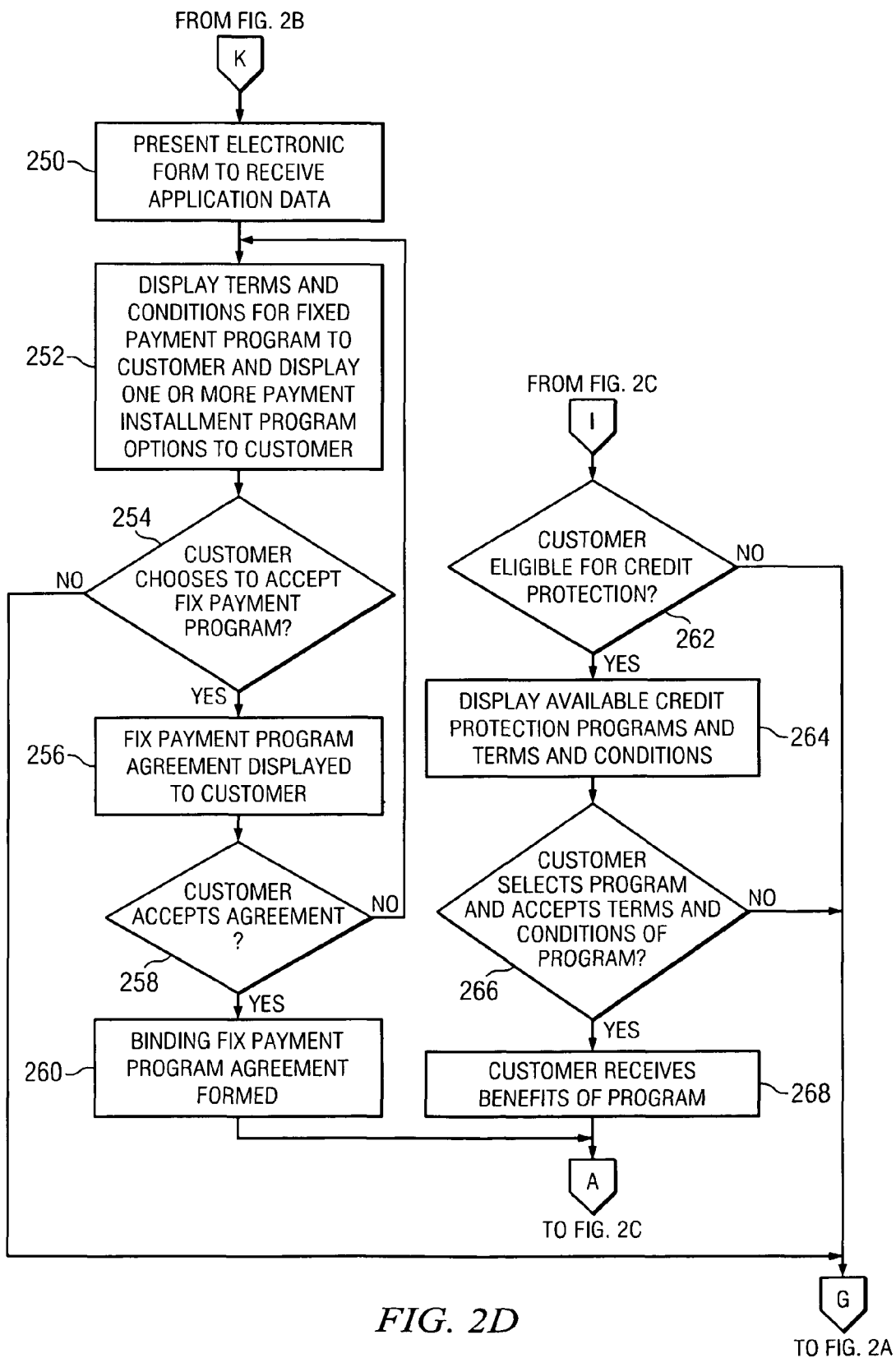

Customer assistance manager 50 may be configured to generate a display to and/or request information from customers 20 to facilitate offers and acceptance of customer assistance, including repayment plans, promises to pay, credit counseling, or other customer assistance, as described in greater detail below with respect to FIGS. 2A-3E. For example, if a customer 20 desires to submit a request and/or information related to a customer account, customer assistance manager 50 may generate a display (e.g., an electronic interview form on a display device of a computer) to customer 20 wherein such display indicates information to be provided as part of the request. Such generated display may be based on, among other things, customer information 66 residing on customer assistance manager 50. As an example, customer information 66 may be utilized such that customer assistance manager 50 may pre-populate information to be displayed to customer 20 (e.g., customer name, address, social security number and/or other profile- or account-level information may be pre-populated in an electronic form) such that the information need not be re-entered and/or such that the information may be verified by customer 20.

Customer assistance manager 50 may include any suitable combination of hardware and/or software implemented in one or more modules to provide the described functions and operations. In some embodiments, customer assistance manager 50 may comprise a general-purpose personal computer (PC), a Macintosh, a workstation, a Unix-based computer, a server computer, or any suitable processing device. In some embodiments, the functions and operations described above may be performed by a pool of multiple workflow managers 50. Customer assistance manager 50 may include processor 52, memory 54, logic 56, and network interface 58. Customer assistance manager 50 may also include imaging and indexing software, as well as connections to external imaging devices, printers or fax machines.

Memory 54 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as customer information 66. Although FIG. 1 illustrates memory 54 as internal to customer assistance manager 50, it is understood that memory 54 may be internal or external to workflow manger 50, depending on particular implementations. Memory 54 may be separate from or integral to other memory devices to achieve any suitable arrangement of memory devices for use in system 10.

Memory 54 is further operable to store logic 56. Logic 56 may generally comprise rules, algorithms, code, tables, and/or other suitable instructions for performing the functionality of customer assistance manager 50. For example, logic 56 may comprise instructions for displaying information related to a customer account and/or facilitating requests, offers, and/or acceptances of customer assistance offers to customers 20.

Memory 54 may be communicatively coupled to processor 52. Processor 52 may be generally operable to execute logic 56 to perform the functionality of customer assistance manager 50. Processor 52 may comprise any suitable combination of hardware and software implemented in one or more modules to provide the described function or operation.

Network interface 58 may communicate information with network 60. Network interface 58 may represent any port or connection, real or virtual, including any suitable hardware and/or software that enables customer assistance manager 50 to exchange information with network 60, customers 20, and/or or other components of system 10.

Network 60 may represent any number and combination of wireline and/or wireless networks suitable for data transmission. Customers 20 and customer assistance manager 50 may be communicatively coupled via one or more networks 60. Network 60 may, for example, communicate internet protocol packets, frame relay frames, asynchronous transfer mode cells, and/or other suitable information between network addresses. Network 60 may include one or more intranets, local area networks, metropolitan area networks, wide area networks, cellular networks, all or a portion of the Internet, and/or any other communication system or systems at one or more locations.

FIGS. 2A-2D illustrate a flow chart illustrating an example method of providing customer assistance via a customer assistance management system (e.g., customer assistance management system 10), in accordance with particular embodiments of the present disclosure. As noted above, teachings of the present disclosure may be implemented in a variety of configurations of system 10. As such, the preferred initialization point for method 200 and the order of the steps 202-248 comprising method 200 may depend on the implementation chosen.

At step 202, a customer 20 may access customer assistance manager 50 (e.g., via a financial institution website) and customer assistance manager 50 may provide an electronic form for customer 20 to enter login credentials. Customer 20 may enter information into such electronic form to login to customer assistance manager 50.

At step 204, customer assistance manager 50 may determine if by reference to customer information 66 whether customer 20 is past due on any loan accounts that customer 20 and a financial institution have established. If no past due accounts are present, method 200 may proceed to step 248, where the financial institution website may be presented to a customer in "standard" or "normal" fashion. Otherwise, if one or more past due accounts are present, method 200 may proceed to step 206, at which customer assistance manager 50 may initiate a customer assistance routine for providing customer 20 with assistance in paying down or paying off past-due amounts or accounts, credit counseling, and/or other assistance. Alternatively, in some embodiments, customer assistance manager 50 may only initiate a customer assistance routine for certain customers in response to determining a past due account exists. For example, the customer assistance routine may not be initiated for past-due customers who have multiple accounts and/or accounts other than loan accounts with the financial institution, but may be initiated for those customers having a single account with the financial institution and/or having only loan accounts with the financial institution.

At step 206, customer assistance manager 50 may, as shown in FIG. 3A, notify customer 20 of past due status, and display to customer 20 a plurality of options with respect to past due accounts, including options to "pay now," "make a promise to pay," or that customer 20 is unable to make a payment. By choosing to "pay now," customer 20 may indicate a willingness (e.g., desire and/or financial ability) to presently pay the full past due amount on the account. By choosing "make a promise to pay," customer 20 may indicate a willingness (e.g., desire and/or financial ability) to pay the full past due amount on the account by a particular date in the future. By choosing that the customer is unable to make a payment, customer 20 may indicate unwillingness (e.g., lack of desire and/or financial ability) of the customer to make a payment on the account either presently or in the near future.

At step 208, customer assistance manager 50 may determine if customer 20 has chosen an option to "pay now." If customer 20 has not chosen the option to "pay now," method 200 may proceed to step 212. Otherwise, if customer 20 has chosen the option to "pay now," method 200 may proceed to step 209. At step 209, customer assistance manager 50 may, as shown in FIG. 3B, query customer 20 whether customer 20 is willing to pay the past due amount. Also as shown in FIG. 3B, customer assistance manager 50 may query customer 20 whether customer 20 is able to make minimum payments going forward. At step 210, customer assistance manager 50 may determine the response of customer 20 to the query. If customer 20 indicates that the customer is willing to pay the past due amount and/or is able to make minimum payments going forward, method 200 may proceed to step 211 where customer 20 may make the past-due payment. Otherwise, if customer 20 indicates that the customer is not willing to pay the past due amount and/or is unable to make minimum payments going forward, method 200 may proceed to step 218.

At step 211, customer 20 may be provided interface screens and/or electronic forms for making a payment for a past due amount or other amount. After completion of step 211, method 200 may proceed to step 248, where the financial institution website may be presented to a customer in "standard" or "normal" fashion. Alternatively, if customer 20 has other past due accounts, method 200 may proceed again to step 206.

At step 212, customer assistance manager may determine if customer 20 has chosen an option to "make a promise to pay."

If a customer 20 has not chosen the option to "make a promise to pay," method 200 may proceed to step 224. Otherwise, if customer 20 has chosen the option to "make a promise to pay," method 200 may proceed to step 214.

At step 214, customer assistance manager 50 may, as shown in FIG. 3B, query customer 20 whether customer 20 is willing to pay the past due amount or outstanding account balance. Also as shown in FIG. 3B, customer assistance manager 50 may query customer 20 whether customer 20 is able to make minimum payments going forward. At step 216, customer assistance manager 50 may determine the response of customer 20 to the query. If customer 20 indicates that the customer is willing to pay the past due amount and/or is able to make minimum payments going forward, method 200 may proceed to step 220 where customer 20 may make a promise to pay at least a portion of the past-due amount by a date certain. Otherwise, if customer 20 indicates that the customer is not willing to pay the past due amount and/or is unable to make minimum payments going forward, method 200 may proceed to step 218.

At step 218, customer assistance manager 50 may determine, based on customer information 66, whether customer 20 is potentially eligible to apply for a reduced settlement program. Customer assistance manager 50 may determine whether customer 20 is eligible to apply for a reduced settlement program based on any suitable criteria, including, without limitation, credit score, employment history, income, expenses, credit risk, ability to pay, etc. In some embodiments, the determination may be made by customer assistance manager 50 based on customer information 66 known at log on (e.g., without querying customer for additional customer information). If customer 20 is eligible to apply, method 200 may proceed to step 228 in which method 200 may execute a reduced settlement routine. Otherwise, method 200 may proceed to step 219 where customer assistance manager 50 may determine if customer 20 is eligible for a fix payment program.

At step 219 customer assistance manager 50 may determine, based on customer information 66, whether customer 20 is potentially eligible to apply for a fix payment program whereby a customer may pay off the full outstanding loan balance or past due amount in accordance with a fix payment plan with payment terms different from the existing loan terms. Customer assistance manager 50 may determine whether customer 20 is eligible to apply for a fix payment program based on any suitable criteria, including, without limitation, credit score, employment history, income, expenses, credit risk, ability to pay, etc. In some embodiments, the determination may be made by customer assistance manager 50 based on customer information 66 known at log on (e.g., without querying customer for additional customer information). If customer 20 is eligible to apply, method 200 may proceed to step 250 in which method 200 may execute a fix payment program routine. Otherwise, method 200 may proceed to step 220 where customer 20 may make a promise to pay at least a portion of the past-due amount by a date certain.

At step 220, customer assistance manager 50 may, as shown in FIG. 3C, provide an electronic form for customer 20 to enter a promise to pay at least a portion of the past-due amount by a date certain. For example, the electronic form may permit customer 20 to choose from a promise to pay the outstanding account balance, the past-due amount, or another amount. If customer 20 chooses to pay another amount, the electronic form presented by customer assistance manager 50 may provide a text field for customer 20 to enter an amount of payment. The electronic form may also include a text field for entering a date for payment. In some embodiments, customer assistance manager 50 may limit the range of dates that may be entered into the date text field (e.g., limit to a date not more than a month in the future).

At step 222, customer assistance manager 50 may determine whether customer 20 has scheduled a payment (e.g., by determining whether customer 20 clicked on "Submit" in FIG. 3C after entering a valid date and payment amount or whether customer 20 clicked on "Cancel"). If customer 20 declines to schedule a promise to pay, method 200 may proceed again to step 206, where customer assistance manager may again notify customer 20 of past due status, and display to customer 20 a plurality of options with respect to past due accounts. Otherwise, if customer 20 schedules a promise to pay, method 200 may proceed to step 248, where the financial institution website may be presented to a customer in "standard" or "normal" fashion. Alternatively, in some embodiments, customer assistance manager 50 may redirect customer 20 to an electronic form for making a payment (e.g., similar to step 210). As another alternative, if customer 20 has other past due accounts, method 200 may proceed again to step 206. In any case, when customer 20 successfully schedules a promise to pay customer assistance manager 50 may update customer information 66 to include customer 20's promise to pay. In some embodiments, the submitted promise to pay may form a legally binding agreement (e.g., the financial institution may agree to allow the loan account to remain open if payment is received in accordance with the promise to pay). In other embodiments, the submitted promise to pay may form no legally binding agreement (e.g., the promise to pay is a mere goal established by customer 20 for which the financial institution may send reminders via email, traditional mail, phone calls, and/or other means of communication with the purpose of receiving payment for the past due account). In these and other embodiments, customer assistance manager 50 may interface with other systems used to aid collection of past-due accounts in order to improve of otherwise affect operability of such other systems (e.g., a system used to aid in collection may list a task to contact a customer about a past-due debt, but in response to a customer's promise to pay, the system may remove the task to call the customer regarding the debt). In these and other embodiments, a customer 20 may be presented with an option to print information regarding the customer's promise to pay.

At step 224, customer assistance manager may determine if customer 20 has chosen an option indicating that customer 20 is unwilling (e.g., lack of desire of ability) to make a payment of the past-due amount. If a customer 20 has not chosen the option indicating that customer 20 is unwilling to make a payment, method 200 may proceed again to step 206 (e.g., the loop of steps 206, 208, 212, and 224 may repeat until customer 20 makes selection of an option). Otherwise, if customer 20 has chosen the option indicating that customer 20 is unwilling to make a payment, method 200 may proceed to step 226.

At step 226, customer assistance manager 50 may determine, based on customer information 66, whether customer 20 is eligible to apply for a reduced settlement offer. Customer assistance manager 50 may determine whether customer 20 is eligible to apply for a reduced settlement offer based on any suitable criteria, including, without limitation, credit score, employment history, income, expenses, credit risk, ability to pay, etc. In some embodiments, the determination may be made by customer assistance manager 50 based on customer information 66 known at log on (e.g., without querying customer for additional customer information). In some embodiments, step 226 may be similar or identical to step 218. If customer 20 is eligible, method 200 may proceed to step 228 in which method 200 may execute a reduced settlement routine. Otherwise, method 200 may proceed to step 227 where customer assistance manager 50 may determine if customer 20 is eligible for a fix payment program.

At step 227 customer assistance manager 50 may determine, based on customer information 66, whether customer 20 is potentially eligible to apply for a fix payment program whereby a customer may pay off the full outstanding loan balance or past due amount in accordance with a fix payment plan with payment terms different from the existing loan terms. Customer assistance manager 50 may determine whether customer 20 is eligible to apply for a fix payment program based on any suitable criteria, including, without limitation, credit score, employment history, income, expenses, credit risk, ability to pay, etc. In some embodiments, the determination may be made by customer assistance manager 50 based on customer information 66 known at log on (e.g., without querying customer for additional customer information). In some embodiments, step 227 may be similar or identical to step 219. If customer 20 is eligible to apply, method 200 may proceed to step 252 in which method 200 may execute a fix payment program routine. Otherwise, method 200 may proceed to step 240 where customer 20 may be offered credit counseling and/or credit protection.

At step 228, in response to a determination that customer 20 is eligible for a reduced settlement, customer assistance manager 50 may present an electronic form to customer 20 wherein customer 20 may input requested data about the customer. Such information may include, without limitation, information regarding customer's credit score, employment history, income, expenses, credit risk, ability to pay, etc.

At step 229, after collection application data, customer assistance manager 50 may, as shown in FIG. 3D, display terms and conditions for a reduced settlement program to customer 20. A reduced settlement program may comprise a proposed agreement wherein a financial institution offers to settle an outstanding balance of a loan for an amount less than the outstanding balance. The terms and conditions may set forth contractual agreement terms that govern the settlement program. The reduced settlement amount may be a part of the terms and conditions and may be calculated by customer assistance manager 50 based on any suitable criteria, including without limitation the present account balance, credit risk, charge-off risk, payment history, and/or other factors. In addition, customer assistance manager 50 may, as shown in FIG. 3D, display one or more payment installment program options to customer 20, to allow customer 20 to select from among a number of different installments in which to pay the settlement amount. For example, as depicted in FIG. 3D, customer 20 may select between one, two, or three installments in which to pay the settlement amount. Customer assistance manager 50 may determine the number of installment payment options to be displayed based on any suitable criteria, including without limitation regulatory requirements. The electronic from displayed in FIG. 3D may also include text entry boxes allowing customer 20 to select installment due dates. In some embodiments, customer assistance manager 50 may limit the range of dates that may be entered into the date text fields (e.g., limit the first payment to a date not more than a month in the future, and limit to no less frequent than monthly installments).

At step 232, customer assistance manager 50 may determine if customer 20 has accepted a settlement offer (e.g., by determining whether customer 20 clicked on "Continue to Accept Settlement" in FIG. 3D after entering valid dates for installment payments or whether customer 20 clicked on "Decline Settlement"). If customer 20 has accepted the settlement offer, method 200 may proceed to step 234. Otherwise, if customer 20 has declined the settlement offer, method 200 may proceed again to step 206. As shown in FIG. 3D, in some embodiments customer 20 may be presented with an option to defer acceptance or non-acceptance of the terms and conditions of the reduced settlement offer (e.g., "Remind Me Later"). In response to selection of this third option, customer assistance manager 50 may be configured to remind customer 20 at a later date (e.g., subsequent login) regarding the availability of the reduced settlement program.

At step 234, customer assistance manager 50 may, as shown in FIG. 5E, display a reduced settlement agreement to customer 20, the reduced settlement agreement setting forth contractual terms for the reduced settlement program. Customer 20 may assent to the reduced settlement agreement by indicating agreement (e.g., by clicking "Agree") or may indicate that customer 20 does not agree (e.g., by clicking on "I don't agree").

At step 236, customer assistance manager 50 may determine if customer 20 has assented to the reduced settlement agreement. If customer 20 has assented to the reduced settlement agreement, method 200 may proceed to step 238. Otherwise, if customer 20 has not assented, method 200 may proceed again to step 229.

At step 238, customer assistance manager 50 may update customer information 66 regarding the reduced settlement agreement. The reduced settlement agreement may be a legally binding agreement whereby a particular amount of the outstanding balance of a loan account may be forgiven provided customer 20 satisfies the various terms of the reduced settlement agreement. After completion of step 238, method 200 may proceed to step 248, where the financial institution website may be presented to a customer in "standard" or "normal" fashion. Alternatively, if customer 20 has other past due accounts, method 200 may proceed again to step 206.

At step 240, in response to a determination that customer 20 is not eligible for a reduced settlement, customer assistance manager 50 may determine if customer 20 is eligible for credit counseling services. A determination regarding whether customer 20 is eligible for credit counseling may be based on any suitable criteria, including without limitation debt/income ratio, other loan balances with the financial institution and/or other creditors, etc. If customer assistance manager 50 determines customer 20 is not eligible for credit counseling, method 200 may proceed to step 262, where the customer's eligibility for credit protection may be determined. Otherwise, if customer 20 is eligible for credit counseling, method 200 may proceed to step 242.

At step 242, customer assistance manager 50 may display terms and conditions related to credit counseling for customer 20. Such display may be similar that that shown in FIG. 3E for a reduced settlement agreement. Customer 20 may assent to the credit counseling terms and conditions by indicating agreement (e.g., by clicking "Agree") or may indicate that customer 20 does not agree (e.g., by clicking on "I don't agree"). In some embodiments, customer 20 may also be given an option to defer agreement or non-agreement (e.g., "Remind Me Later"). If such a deferment option is chosen, customer assistance manager 50 may be configured to remind customer 20 of the availability of credit counseling at a later date (e.g., subsequent logon).

At step 244, customer assistance manager 50 may determine if customer 20 has assented to the credit counseling terms and conditions. If customer 20 has assented to the terms and conditions, method 200 may proceed to step 246. Otherwise, if customer 20 has not assented, method 200 may proceed again to step 206.

At step 246, in response to assent by customer 20 to the credit counseling terms and conditions, customer assistance manager 50 may redirect customer 20 to credit counseling services (e.g., a website of a third-party provider of credit counseling, or one or more phone numbers for credit counseling services). After completion of step 246, method 200 may proceed to step 248.

At step 248, the financial institution website displayed to customer 20 may operate in its "normal" or "standard" manner.

At step 250, in response to a determination that customer 20 is eligible for a fix payment program, customer assistance manager 50 may present an electronic form to customer 20 wherein customer 20 may input requested data about the customer. Such information may include, without limitation, information regarding customer's credit score, employment history, income, expenses, credit risk, ability to pay, etc.

At step 252, after collection application data, customer assistance manager 50 may, as shown in FIG. 3F, display terms and conditions for a fix payment program to customer 20. A fix payment program may comprise a proposed agreement wherein a financial institution offers to settle an outstanding balance of a loan on different terms and conditions than those presently application to the loan, but without reducing the then-present account balance. For example, the fix payment program may result in a decrease in an applicable annual percentage rate for the account, thus reducing customer payments in accordance with the outstanding balance. The terms and conditions may set forth contractual agreement terms that govern the settlement program. The terms and conditions of the fix payment program and may be calculated by customer assistance manager 50 based on any suitable criteria, including without limitation the present account balance, credit risk, charge-off risk, payment history, and/or other factors. In addition, customer assistance manager 50 may, as shown in FIG. 3F, display one or more text entry boxes allowing customer 20 to select installment due dates. In some embodiments, customer assistance manager 50 may limit the range of dates that may be entered into the date text fields (e.g., limit the first payment to a date not more than a month in the future).

At step 254, customer assistance manager 50 may determine if customer 20 has accepted a settlement offer (e.g., by determining whether customer 20 clicked on "Proceed to Accept Program" in FIG. 3F after entering valid dates for installment payments or whether customer 20 clicked on "Decline Program"). If customer 20 has accepted the fix payment program, method 200 may proceed to step 258. Otherwise, if customer 20 has declined the settlement offer, method 200 may proceed again to step 206. As shown in FIG. 3F, in some embodiments customer 20 may be presented with an option to defer acceptance or non-acceptance of the terms and conditions of the fix payment program (e.g., "Remind Me Later"). In response to selection of this third option, customer assistance manager 50 may be configured to remind customer 20 at a later date (e.g., subsequent login) regarding the availability of the fix payment program.

At step 256, customer assistance manager 50 may, display a fix payment program agreement to customer 20, the fix payment program agreement setting forth contractual terms for the fix payment program. The fix payment program agreement displayed may be similar to that shown in FIG. 5E. Customer 20 may assent to the reduced settlement agreement by indicating agreement (e.g., by clicking "Agree") or may indicate that customer 20 does not agree (e.g., by clicking on "I don't agree").

At step 258, customer assistance manager 50 may determine if customer 20 has assented to the fix payment program agreement. If customer 20 has assented to the fix payment program agreement, method 200 may proceed to step 260. Otherwise, if customer 20 has not assented, method 200 may proceed again to step 252.

At step 260, customer assistance manager 50 may update customer information 66 regarding the fix payment program agreement. The fix payment program agreement may be a legally binding agreement whereby the existing loan account may be modified or replaced by the terms and conditions of the fix payment program agreement provided customer 20 satisfies the various terms of the reduced settlement agreement. After completion of step 260, method 200 may proceed to step 248, where the financial institution website may be presented to a customer in "standard" or "normal" fashion. Alternatively, if customer 20 has other past due accounts, method 200 may proceed again to step 206.

At step 262, in response to a determination that customer 20 is not eligible for credit counseling, customer assistance manager 50 may determine if customer 20 is eligible for credit protection. A determination regarding whether customer 20 is eligible for credit protection may be based on any suitable criteria, including without limitation whether customer 20 has enrolled for credit protection benefits and/or whether customer 20 meets the guidelines for accepting benefits under the a credit protection program (e.g., loss of income, loss of employment, and/or other qualifying condition). If customer assistance manager 50 determines customer 20 is not eligible for credit protection, method 200 may proceed to step 206. Otherwise, if customer 20 is eligible for credit protection, method 200 may proceed to step 264.

At step 264, customer assistance manager 50 may display terms and conditions related to credit protection for customer 20, including a list of one of more credit protection programs from customer 20 may select to receive benefits. Customer 20 may assent to the credit protection program terms and conditions by indicating agreement (e.g., by clicking "Agree") or may indicate that customer 20 does not agree (e.g., by clicking on "I don't agree"). In some embodiments, customer 20 may also be given an option to defer agreement or non-agreement (e.g., "Remind Me Later"). If such a deferment option is chosen, customer assistance manager 50 may be configured to remind customer 20 of the availability of credit protection at a later date (e.g., subsequent logon).

At step 266, customer assistance manager 50 may determine if customer 20 has assented to the credit protection program terms and conditions. If customer 20 has assented to the terms and conditions, method 200 may proceed to step 268. Otherwise, if customer 20 has not assented, method 200 may proceed again to step 206.

At step 268, in response to assent by customer 20 to credit protection program terms and conditions, customer assistance manager 50 may redirect customer 20 to information on taking advantage of a selected credit protection program and customer 20 may be enrolled to receive the benefits of such program. After completion of step 268, method 200 may proceed to step 248.

Although FIGS. 2A-2D disclose a particular number of steps to be taken with respect to method 200, method 200 may be executed with greater or lesser steps than those depicted in FIGS. 2A-2D. In addition, although FIGS. 2A-2D discloses a certain order of steps to be taken with respect to method 200, the steps comprising method 200 may be completed in any suitable order. In addition, the steps comprising method 200 may be repeated, independently and/or collectively, as often as desired or required by a chosen implementation.

Method 200 may be implemented using system 10 or any other system operable to implement method 200. In certain embodiments, method 200 may be implemented partially or fully in software and/or firmware embodied in computer-readable media.

As used herein, the terms "willing" or "willingness" are used to indicate a customer desire and/or ability to pay a debt, while the terms "unwilling" and "unwillingness" are used to indicate a lack of customer desire and/or lack of a customer ability to pay a debt.

Modifications, additions, or omissions may be made to system 10 without departing from the scope of the present disclosure. For example, when a component of system 10 determines information, the component may determine the information locally or may receive the information from a remote location. As another example, in the illustrated embodiment, customers 20 and customer assistance manager 50 are represented as different components of system 10. However, the functions of customers 20 and customer assistance manager 50 may be performed by any suitable combination of one or more servers or other components at one or more locations. In the embodiment where the various components are servers, the servers may be public or private servers, and each server may be a virtual or physical server. The server may include one or more servers at the same or at remote locations. Also, customer assistance manager 50 may include any suitable component that functions as a server. Additionally, system 10 may include any number of customers 20 and customer assistance managers 50. Any suitable logic may perform the functions of system 10 and the components within system 10.

What is claimed is:

1. An apparatus for facilitating payment by a customer of a past-due amount associated with an account, comprising:
 a network interface configured to receive data from and communicate data to a remote electronic device associated with a customer; and
 a processor coupled to the network interface, the processor configured to:
  communicate to the remote electronic device, via the network interface, an electronic query regarding whether the customer is willing to pay at least a portion of a past-due amount associated with an account, the electronic query comprising at least the past-due amount, a balance associated with the account, and an identifier associated with the account;
  receive from the remote electronic device, via the network interface, a response to the query, the response indicating that the customer is unwilling to pay at least a portion of the past-due amount; and
  in response to the response indicating that the customer is unwilling to pay at least a portion of the past-due amount:
   receive customer information associated with the customer, the customer information comprising at least a credit score associated with the customer and an employment history associated with the customer;
   determine, based at least upon the credit score and the employment history, whether the customer is eligible for a payment program for the account; and
   in response to determining that the customer is eligible for a payment program:
    communicate to the remote electronic device, via the network interface, terms and conditions associated with a payment program agreement, the terms and conditions comprising at least a new payment amount, wherein the new payment amount is less than the balance associated with the account; and
    communicate to the remote electronic device, via the network interface, an electronic form for entry of information related to payment in accordance with the payment program agreement.

2. An apparatus according to claim 1, the processor further configured to:
 receive from the remote electronic device, via the network interface, credentials for identifying the customer; and
 wherein receiving the customer information comprises determining information associated with the credentials.

3. An apparatus according to claim 1, wherein the payment program comprises one of a reduced settlement program and a fix payment program.

4. An apparatus according to claim 1, the terms and conditions associated with the payment program agreement further comprising a reduced interest rate.

5. An apparatus according to claim 1, wherein the electronic form includes a plurality of options regarding a number of installments in which the customer desires to pay the new payment amount.

6. An apparatus according to claim 5, wherein the plurality of options is based on the customer information.

7. An apparatus according to claim 1, the processor further configured to communicate to the remote electronic device, via the network interface, graphical elements from which the customer may indicate an agreement or a disagreement with the terms and conditions of the payment program agreement.

8. An apparatus according to claim 7, wherein a binding contractual agreement is formed is response to the customer's agreement with the terms and conditions of the payment program agreement.

9. A non-transitory computer readable medium comprising logic, the logic configured, when executed on a processor, to:
 communicate to the remote electronic device, via the network interface, an electronic query regarding whether the customer is willing to pay at least a portion of a past-due amount associated with an account, the electronic query comprising at least the past-due amount, a balance associated with the account, and an identifier associated with the account;
 receive from the remote electronic device, via the network interface, a response to the query, the response indicating that the customer is unwilling to pay at least a portion of the past-due amount; and
 in response to the response indicating that the customer is unwilling to pay at least a portion of the past-due amount:
  retrieve receive customer information associated with the customer, the customer information comprising at least a credit score associated with the customer and an employment history associated with the customer;
  determine, based at least upon the credit score and the employment history, whether the customer is eligible for a payment program for the account; and
  in response to determining that the customer is eligible for a payment program:
   communicate to the remote electronic device, via the network interface, terms and conditions associated with a payment program agreement, the terms and conditions comprising at least a new payment amount, wherein the new payment amount is less than the balance associated with the account; and communicate to the remote electronic device, via the network interface, an electronic form for entry of information related to payment in accordance with the payment program agreement.

10. A non-transitory computer readable medium according to claim 9, the logic further configured to:

receive from the remote electronic device, via the network interface, credentials for identifying the customer; and wherein receiving the customer information comprises determining information associated with the credentials.

11. A non-transitory computer readable medium according to claim 9, wherein the payment program comprises one of a reduced settlement program and a fix payment program.

12. A non-transitory computer readable medium according to claim 9, the terms and conditions associated with the payment program agreement further comprising a reduced interest rate.

13. A non-transitory computer readable medium according to claim 9, wherein the electronic form includes a plurality of options regarding a number of installments in which the customer desires to pay the new payment amount.

14. A non-transitory computer readable medium according to claim 13, wherein the plurality of options is based on the customer information.

15. A non-transitory computer readable medium according to claim 9 the logic further configured to communicate to the remote electronic device, via the network interface, graphical elements from which the customer may indicate an agreement or a disagreement with the terms and conditions of the payment program agreement.

16. A non-transitory computer readable medium according to claim 15, wherein a binding contractual agreement is formed is response to the customer's agreement with the terms and conditions of the payment program agreement.

17. A method comprising:

communicating to a remote electronic device, by a network interface, an electronic query regarding whether the customer is willing to pay at least a portion of a past-due amount associated with an account, the electronic query comprising at least the past-due amount, a balance associated with the account, and an identifier associated with the account;

receiving from the remote electronic device, via the network interface, a response to the query, the response indicating that the customer is unwilling to pay at least a portion of the past-due amount; and in response to the response indicating that the customer is unwilling to pay at least a portion of the past-due amount:

receiving customer information associated with the customer, the customer information comprising at least a credit score associated with the customer and an employment history associated with the customer;

determining, based at least upon the credit score and the employment history, whether the customer is eligible for a payment program for the account; and in response to determining that the customer is eligible for a payment program:

communicating to the remote electronic device, via the network interface, terms and conditions associated with a payment program agreement, the terms and conditions comprising at least a new payment amount, wherein the new payment amount is less than the balance associated with the account; and communicating to the remote electronic device, via the network interface, an electronic form for entry of information related to payment in accordance with the payment program agreement.

18. A method according to claim 17, further comprising:

receiving from the remote electronic device, via the network interface, credentials for identifying the customer; and wherein receiving the customer information comprises determining information associated with the credentials.

19. A method according to claim 17, wherein the payment program comprises one of a reduced settlement program and a fix payment program.

20. A method according to claim 17, the terms and conditions associated with the payment program agreement further comprising a reduced interest rate.

21. A method according to claim 17, wherein the electronic form includes a plurality of options regarding a number of installments in which the customer desires to pay the new payment amount.

22. A method according to claim 21, wherein the plurality of options is based on the customer information.

23. A method according to claim 17, further comprising communicating to the remote electronic device, via the network interface, graphical elements from which the customer may indicate an agreement or a disagreement with the terms and conditions of the payment program agreement.

24. A method according to claim 23, wherein a binding contractual agreement is formed is response to the customer's agreement with the terms and conditions of the payment program agreement.

* * * * *